June 23, 1931.   E. S. COLE   1,810,907
PITOT TUBE CONNECTION OR ROD METER
Filed April 5, 1926
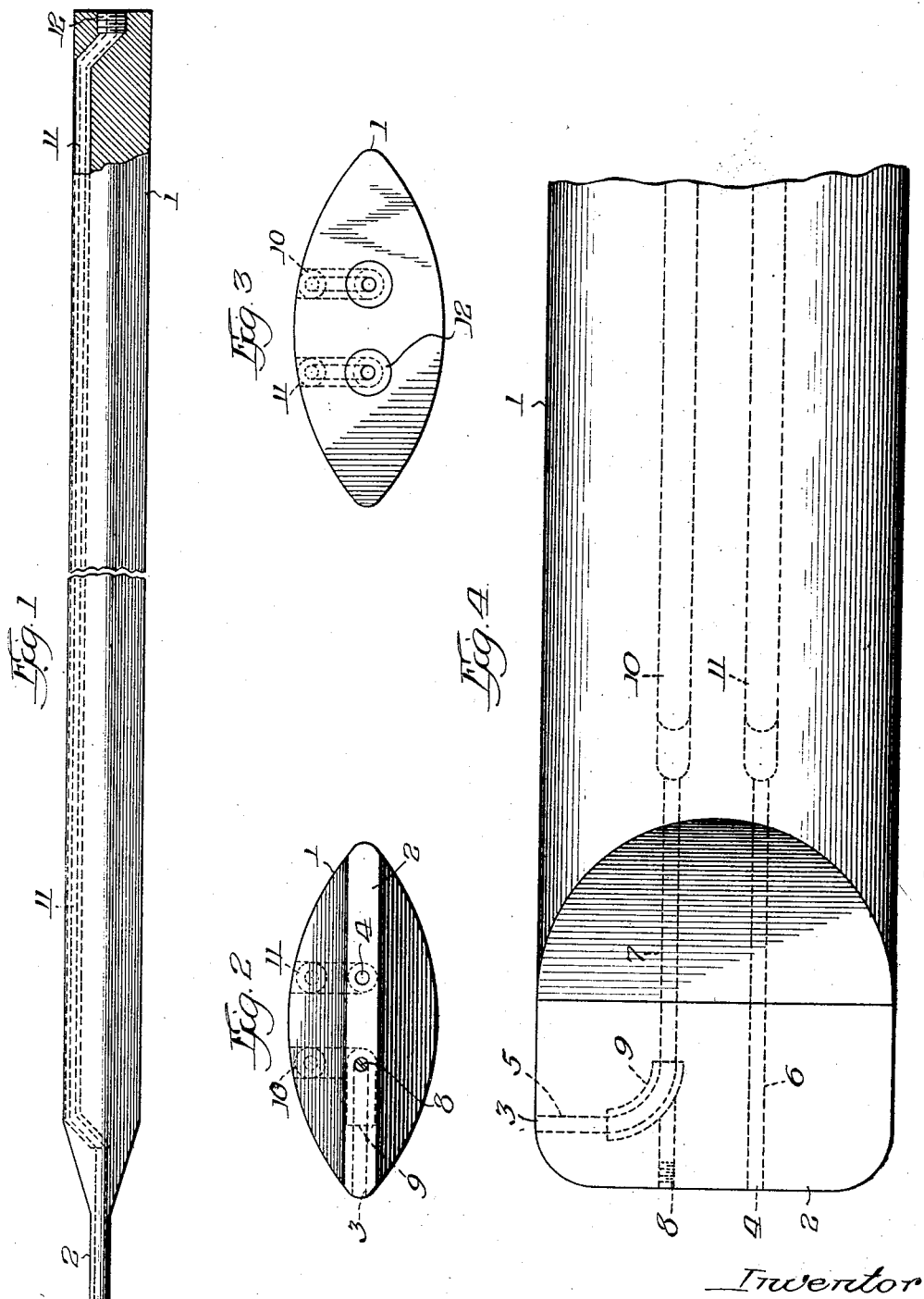
Inventor
Edward S. Cole Patented June 23, 1931

1,810,907

UNITED STATES PATENT OFFICE

EDWARD S. COLE, OF NEW YORK, N. Y.

PITOT TUBE CONNECTION OR ROD METER

Application filed April 5, 1926. Serial No. 99,797.

My invention relates to Pitot tube connections or rod meters, as they are commonly called.

One of the objects of the invention is to provide a simple, practical, inexpensive and effective form of Pitot tube connection or rod meter.

Another object of the invention is to secure sufficient strength and rigidity in such a device as to withstand hard, rough and even violent usage, as for example, such usage as will be given the instrument on board a high speed ship at sea.

Another object of the invention is to secure a practical form of device which may be manufactured in a practical manner in a machine shop or other factory, and which will be very durable and substantial in service.

In the accompanying drawings Fig. 1 is a side elevation of a Pitot tube connection or rod meter embodying my present invention;

Fig. 2 is a view looking at the left hand end of the device in Fig. 1;

Fig. 3 is a view looking at the right hand end of said device; and

Fig. 4 is a view looking down on said device.

Referring to the drawings, I show a device comprising a solid bar or rod 1, which will be made of any suitable metal, but preferably is made of extruded manganese bronze. This bar or rod is preferably of a substantially oval cross section or shape, as shown in Figs. 2 and 3, but has a flattened end 2 which is the end in which the pressure and static openings or apertures are to be formed.

The pressure aperture or orifice is shown at 3 and the static opening or orifice at 4. Both these orifices are preferably formed by boring ducts or passages 5 and 6, respectively, in the rod or bar 1, the former being bored crosswise of the rod as shown in Fig. 4, and the latter being bored lengthwise thereof. The duct or passage 5 connects with a longitudinally extending duct or passage 7 which is also preferably formed in the rod or bar 1 by boring a longitudinally extending passage in said rod or bar 1, and then closing or stopping up one end thereof as by a plug 8. The connection between passages 5 and 7 is preferably made by an elbow 9 laid in a groove formed in said rod or bar 1. The groove for the elbow 9 it will be understood, is formed by cutting through one surface of the flattened end 2 and after the elbow is inserted the remainder of the space is filled with solder-like material to form a smooth surface.

Tubes or pipes 10 and 11 are carried by the rod or bar 1 and connected with the orifice passages 7 and 6, respectively. These tubes or pipes 10 and 11 are preferably laid in grooves or recesses formed longitudinally in the rod or bar 1 and extending substantially from end to end of the same so as to connect at one end with the passages 7 and 6 leading to orifices 3 and 4, and at the other end terminating in sockets 12, preferably threaded for convenient connection of other tubes or pipes with said rod or bar 1. The grooves in which these tubes or pipes 10 and 11 are laid are preferably of substantially the same depth as the thickness of said tubes or pipes, so that the latter when in position will have their outer surfaces substantially flush with the surface of the rod or bar 1, as shown in Fig. 1, and said tubes or pipes are then secured firmly in position in their grooves or recesses, as by soldering them therein, the solder preferably filling the groove and recesses so that the surface of the pipe is smooth as seen in Figs. 2 and 4.

In this way a very substantial, strong and rigid rod meter is provided capable of withstanding the most severe and trying usage, and the hydraulic or pressure passages therein are formed in a practical manner capable of ready execution in a modern machine shop and at the same time the rod is weakened a minimum amount by the presence of these passages or ducts in it.

It is understood that changes and modifications may be made without departing from the spirit of the invention.

What I claim is:

1. In a device of the class specified comprising a rod or bar having longitudinal grooves formed in the surface thereof and pressure tubes parallel to the longitudinal axis of the said rod, said tubes occupying, and being secured in the said longitudinal grooves.

2. In a device of the class specified comprising a metallic rod or bar having longitudinal grooves formed in the surface thereof, and pressure tubes parallel to the longitudinal axis of the said rod, said tubes being laid and soldered in the said longitudinal grooves.

3. In a device of the class specified comprising a metallic rod or bar having longitudinal grooves formed in the surface thereof; pressure tubes parallel to the longitudinal axis of the said rod, said tubes being laid and soldered in the said longitudinal grooves; said rod having dynamic and static pressure orifices at one end thereof and means communicating said orifices with the said pressure tubes.

4. In a device of the class specified comprising a metallic bar or rod of substantially oval cross-section, having one of its ends provided with pressure and static orifices and provided with pressure tubes or pipes extending longitudinally of the rod and communicating with said orifices, said rod having grooves formed in the surface of the said rod, said tubes or pipes laid and secured in said grooves.

5. In a device of the class specified comprising a metallic bar or rod of substantially oval cross-section and having longitudinal surface grooves, one end of the rod being provided with dynamic and static pressure orifices and the rod being also provided with pressure tubes or pipes extending lengthwise of the rod and communicating with said orifices, said tubes or pipes being laid and soldered in said surface grooves, said grooves being formed in the surface of the rod.

6. A device of the class specified comprising a metallic rod or bar of substantially oval cross-section having one end flattened and provided with pressure and static orifices, and ducts or passages connected with said orifices and formed by boring in the rod or bar, said rod having grooves formed in the surface of one of the flattened portions of the rod or bar, and pipes or tubes connected with said bored ducts or passages, said tubes being laid and soldered in said grooves so as to be substantially flush with the surface of the rod or bar.

7. A device of the class specified comprising a metallic rod or bar of substantially oval form having one end flattened and provided with dynamic and static pressure orifices, and ducts or passages connected with said orifices and formed by boring in the rod or bar; one of the surfaces of the bar having grooves formed therein; pipes connected with the said bored ducts or passages and laid and soldered in said grooves so formed in the rod or bar, so as to be substantially flush with the surface thereof, the duct or passage connecting the dynamic orifice with its pipe being formed by two ducts or passages bored at right angles to one another, an elbow for connecting same, said elbow being laid and secured in position in the rod or bar.

In witness whereof, I hereunto subscribe my name this 29th day of March, A. D., 1926.

EDWARD S. COLE.